US012613545B2

(12) United States Patent
Lu et al.

(10) Patent No.: US 12,613,545 B2
(45) Date of Patent: Apr. 28, 2026

(54) LOW-PROFILE POWER SUPPLY REGULATOR UTILIZING FLIPPED VOLTAGE FOLLOWER

(71) Applicant: QUALCOMM Incorporated, San Diego, CA (US)

(72) Inventors: Rundao Lu, San Diego, CA (US); Sameer Wadhwa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 18/584,255

(22) Filed: Feb. 22, 2024

(65) Prior Publication Data

US 2025/0271885 A1 Aug. 28, 2025

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC ........... G05F 3/262; G05F 1/575; G05F 1/468
See application file for complete search history.

(56) References Cited

U.S. PATENT DOCUMENTS 9,746,864 B1 8/2017 Narang et al.
11,003,202 B2 * 5/2021 Golara .................... G05F 1/575
11,249,501 B2 * 2/2022 Fort ........................ G05F 1/575
11,300,985 B2 * 4/2022 Fort ........................ G05F 1/445
2019/0235543 A1 8/2019 Chen et al.
2024/0178753 A1 * 5/2024 Xu .......................... G05F 1/575

FOREIGN PATENT DOCUMENTS

CN 111665894 B 4/2021

OTHER PUBLICATIONS

Carvajal R.G., et al., "The Flipped Voltage Follower: A Useful Cell for Low-Voltage Low-Power Circuit Design", IEEE Transactions on Circuits and Systems—I: Regular Papers, vol. 52, No. 7, Jul. 2005, pp. 1276-1291.

(Continued)

*Primary Examiner* — Sisay G Tiku

(74) *Attorney, Agent, or Firm* — Loza & Loza, LLP

(57) ABSTRACT

A method for operating a voltage regulator is disclosed. The voltage regulator includes a first transistor and a second transistor, wherein a source of the first transistor is coupled to a supply rail, a drain of the first transistor is coupled to an output of the voltage regulator, a source of the second transistor is coupled to the output of the voltage regulator, and a drain of the second transistor is coupled to a gate of the first transistor via a feedback path. The method includes generating a current, passing the current through a resistor and a third transistor to generate a reference voltage, adjusting a resistance of the third transistor based on an output voltage at the output of the voltage regulator, and inputting the reference voltage to a gate of the second transistor.

17 Claims, 10 Drawing Sheets

(56) References Cited

OTHER PUBLICATIONS

Blakiewicz G., "Output-capacitorless Low-dropout Regulator Using a Cascoded Flipped Voltage Follower", IET Circuits Devices and Systems, the Institution of Engineering and Technology, GB, vol. 5, No. 5, Sep. 16, 2011, pp. 418-423, XP006041880, abstract; figure 4.
International Search Report and Written Opinion—PCT/US2025/011069—ISA/EPO1'Apr. 25, 2025.
Lin F-T., et al., "A 3.6 [mu], W, 0.65V Regulator With an Embedded Temperature Compensated Voltage Reference", 2016 13th International Conference on Synthesis, Modeling, Analysis and Simulation Methods and Applications to Circuit Design (SMACD), IEEE, Jun. 27, 2016, pp. 1-4, 4 pages, XP032929668, abstract; figure 1.

* cited by examiner

LOW-PROFILE POWER SUPPLY REGULATOR UTILIZING FLIPPED VOLTAGE FOLLOWER

BACKGROUND

Field

Aspects of the present disclosure relate generally to voltage regulators, and more particularly, to voltage regulators utilizing flipped voltage followers.

Background

Voltage regulators are used in a variety of systems to provide regulated voltages to circuits in the systems. A voltage regulator may be implemented with a flipped voltage follower including a pass transistor and a source-follower transistor coupled in a feedback loop to provide a clean regulated voltage from a noisy power supply rail.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a voltage regulator. The voltage regulator includes a first transistor, wherein a source of the first transistor is coupled to a supply rail, and a drain of the first transistor is coupled to an output of the voltage regulator. The voltage regulator also includes a second transistor, wherein a source of the second transistor is coupled to the output of the voltage regulator, and a drain of the second transistor is coupled to a gate of the first transistor via a feedback path. The voltage regulator also includes a first current source coupled to the drain of the second transistor, a second current source, and a third transistor, wherein a gate of the third transistor is coupled to the output of the voltage regulator, and a source of the third transistor is coupled to a ground. The voltage regulator further includes a resistor coupled between a drain of the third transistor and the second current source, wherein the gate of the second transistor is coupled between the resistor and the second current source.

A second aspect relates to a method for operating a voltage regulator. The voltage regulator includes a first transistor and a second transistor, wherein a source of the first transistor is coupled to a supply rail, a drain of the first transistor is coupled to an output of the voltage regulator, a source of the second transistor is coupled to the output of the voltage regulator, and a drain of the second transistor is coupled to a gate of the first transistor via a feedback path. The method includes generating a current, and passing the current through a resistor and a third transistor to generate a reference voltage. The method also includes adjusting a resistance of the third transistor based on an output voltage at the output of the voltage regulator, and inputting the reference voltage to a gate of the second transistor.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
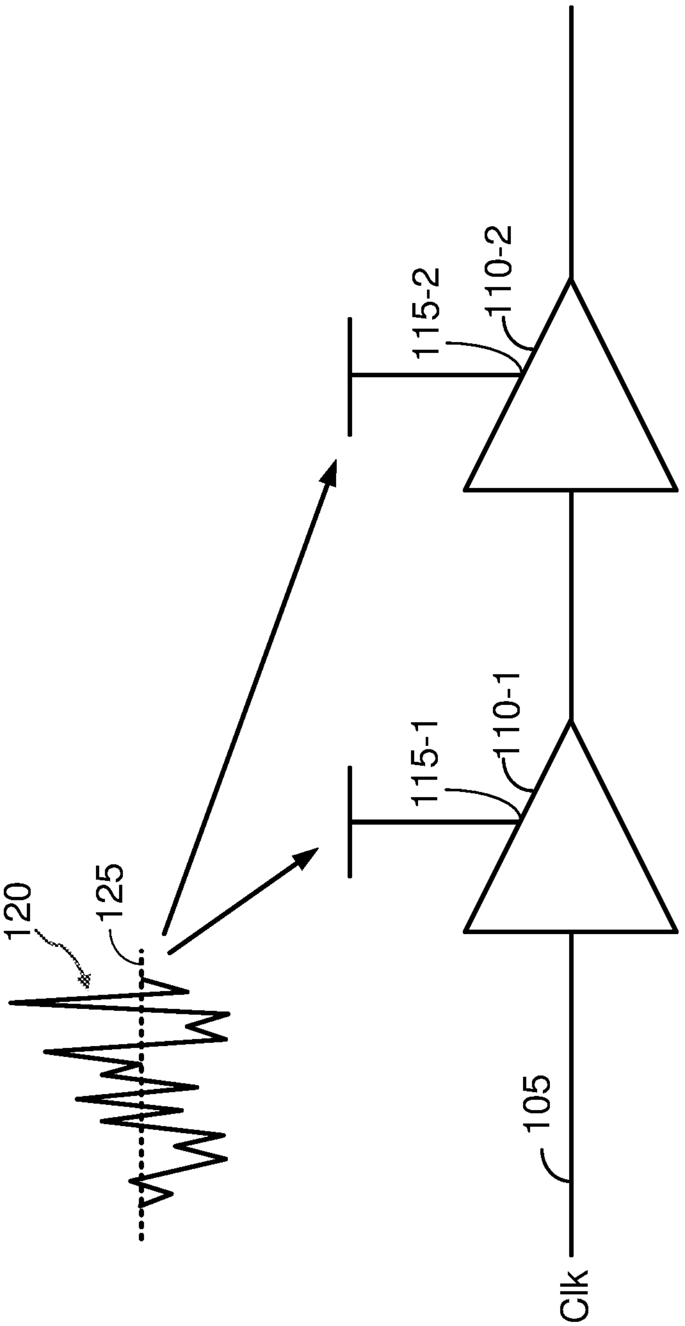
FIG. 1 shows an example of clock buffers coupled to a supply rail according to certain aspects of the present disclosure.

FIG. 1 shows an example of a clock path 105 including clock buffers 110-1 and 110-2 for distributing a clock signal Clk from a clock source (not shown) to one or more circuits (not shown) in a system. The clock buffers 110-1 and 110-2 propagate the clock signal Clk through the clock path 105 and drive the loads of the one or more circuits with the clock signal Clk. Although two clock buffers are shown in the example in FIG. 1, it is to be appreciated that the clock path 105 may include a single clock buffer or more than two clock buffers. It is also to be appreciated that the clock path 105 may split into two or more branches (e.g., to form a clock tree).

Each of the clock buffers 110-1 and 110-2 has a respective power terminal 115-1 and 115-2 coupled to a supply rail (also referred to as a power rail) for powering the clock buffers 110-1 and 110-2. The supply rail provides the clock buffers 110-1 and 110-2 with a supply voltage from a power source (e.g., a power management integrated circuit (PMIC)). A challenge with powering the clock buffers 110-1 and 110-2 using the supply rail is that the noise may be coupled into the supply rail resulting in power supply noise on the supply rail. The noise may come from other circuits in the system such as digital circuits, adjacent transmit/receive (TX/RX) lanes used in chip-to-chip communication, and/or other circuits. The noise may be coupled from the other circuits to the supply rail via inductive coupling, capacitive coupling, a shared bump, and the like. FIG. 1 shows an example of power supply noise 120 superimposed on the supply voltage 125.

The supply noise causes the clock buffers 110-1 and 110-2 to introduce clock jitter in the clock signal Clk. The clock jitter may be proportional to the delays of the clock buffers 110-1 and 110-2 and the power supply noise amplitude. The clock jitter may result in timing violations (e.g., setup time and/or hold time violations) in the system. The clock jitter may be reduced by increasing the diving strengths of the clock buffers 110-1 to 110-2 to achieve lower delays in the clock buffers 110-1 and 110-2. However, this approach increases the power consumption of the clock buffers 110-1 and 110-2. Another approach is to increase the size of decoupling capacitors (i.e., decap size) on sensitive power nets to reduce power supply noise coupling. However, increasing the size of the decoupling capacitors takes up more area on a chip.

Another approach is to couple a voltage regulator between the noisy supply rail and the clock buffers 110-1 and 110-2. The voltage regulator suppresses the power supply noise in the supply voltage to provide a clean regulated voltage to the clock buffers 110-1 and 110-2.

Figure 2:
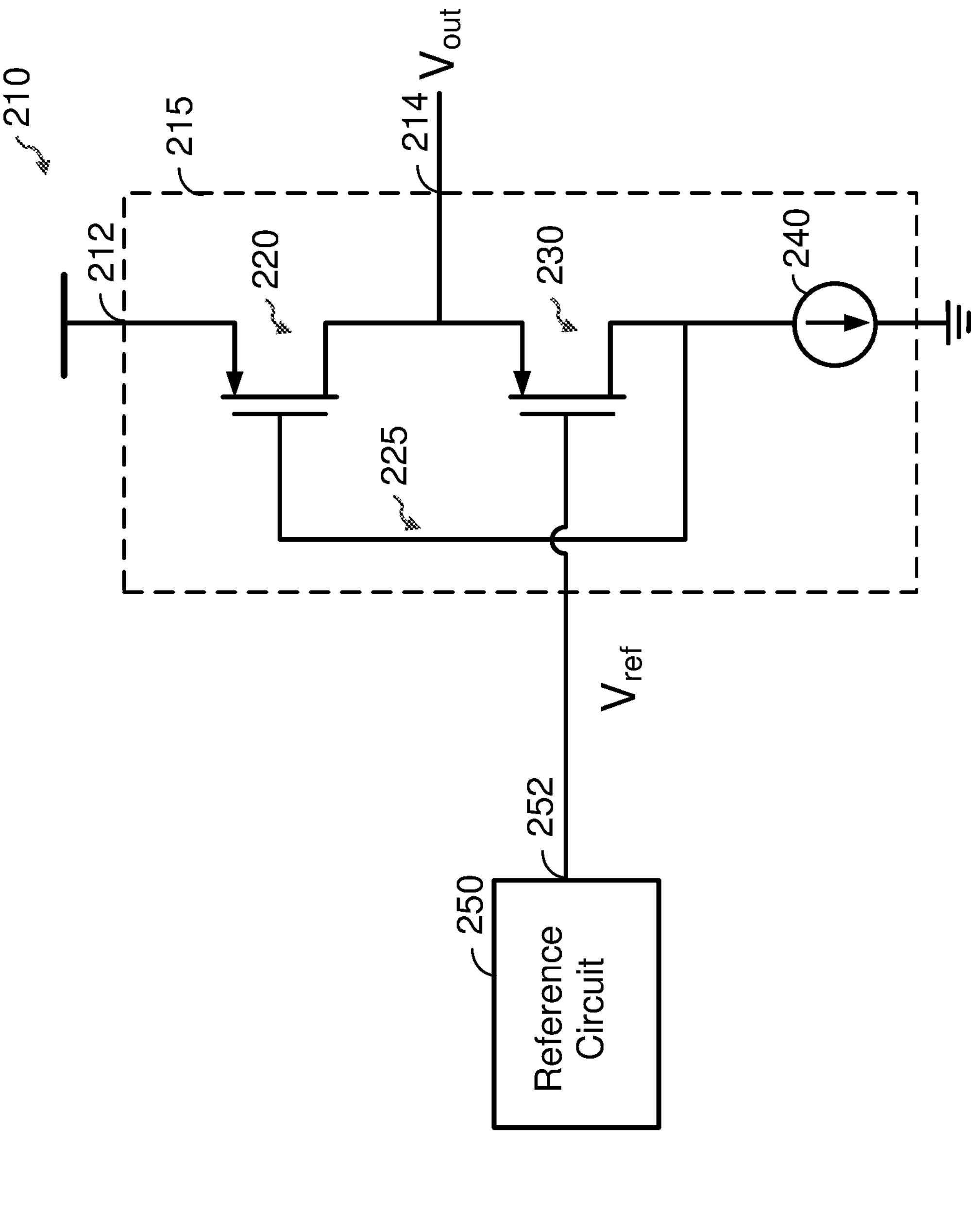
FIG. 2 shows an example of a voltage regulator including a flipped source follower (FVF) circuit and a reference circuit according to certain aspects of the present disclosure.

FIG. 2 shows an example of a voltage regulator 210 according to certain aspects. In this example, the voltage regulator 210 includes a flipped voltage follower (FVF) circuit 215 and a reference circuit 250. The voltage regulator 210 has an input 212 coupled to a supply rail and an output 214 coupled to a circuit receiving power (e.g., the clock buffers 110-1 and 110-2). The voltage regulator 210 is configured to receive a noisy supply voltage from the supply rail at the input 212 and provide a clean regulated voltage $V_{out}$ at the output 214.

The FVF circuit 215 includes a first transistor 220, a second transistor 230, and a current source 240. The source of the first transistor 220 is coupled to the input 212 of the voltage regulator 210 and the drain of the first transistor 220 is coupled to the output 214 of the voltage regulator 210. As discussed further below, the first transistor 220 is used as a pass transistor to source current from the supply rail to the circuit (e.g., the clock buffers 110-1 and 110-2) coupled to the output 214. In this example, each of the first transistor 220 and the second transistor 230 is implemented with a respective p-type field effect transistor (PFET). However, it is to be appreciated that the first transistor 220 and the second transistor 230 are not limited to a particular device type. For example, in other implementations, each of the first transistor 220 and the second transistor 230 may be implemented with a respective n-type field effect transistor (NFET).

The second transistor 230 is coupled in a source follower configuration in which source of the second transistor 230 is coupled to the output 214 of the voltage regulator 210 and the gate of the second transistor 230 is coupled to an output 252 of the reference circuit 250. The reference circuit 250 is configured to generate a reference voltage $V_{ref}$ and input to the reference voltage $V_{ref}$ to the gate of the second transistor 230 via the output 252. The voltage at the output 214 of the voltage regulator 210 is equal to the reference voltage $V_{ref}$ at the gate of the second transistor 230 plus the source-to-gate voltage of the second transistor 230, which is approximately equal to the threshold voltage of the second transistor 230. Thus, the regulated voltage $V_{out}$ at the output 214 of the voltage regulator 210 is approximately equal to the reference voltage $V_{ref}$ plus the threshold voltage of the second transistor 230.

The current source 240 is coupled between the drain of the second transistor 230 and ground. The current source 240 is configured to provide a bias current for the second transistor 230. The current source 240 may be implemented with a transistor in which the bias current is controlled by a voltage applied to the gate of the transistor.

As shown in FIG. 2, the drain of the second transistor 230 is coupled to the gate of the first transistor 220 via a feedback path 225. This couples the first transistor 220 and the second transistor 230 into a feedback loop that suppresses the power supply noise at the output 214 and allows the first transistor 220 to source a large amount of current to the circuit (not shown) coupled to the output 214 while maintaining the regulated voltage $V_{out}$.

As discussed above, the regulated voltage $V_{out}$ is approximately equal to the reference voltage $V_{ref}$ plus the threshold voltage of the second transistor 230. Thus, the regulated voltage $V_{out}$ may be set to a desired voltage by setting the reference voltage $V_{ref}$ generated by the reference circuit 250 accordingly.

Figure 3:
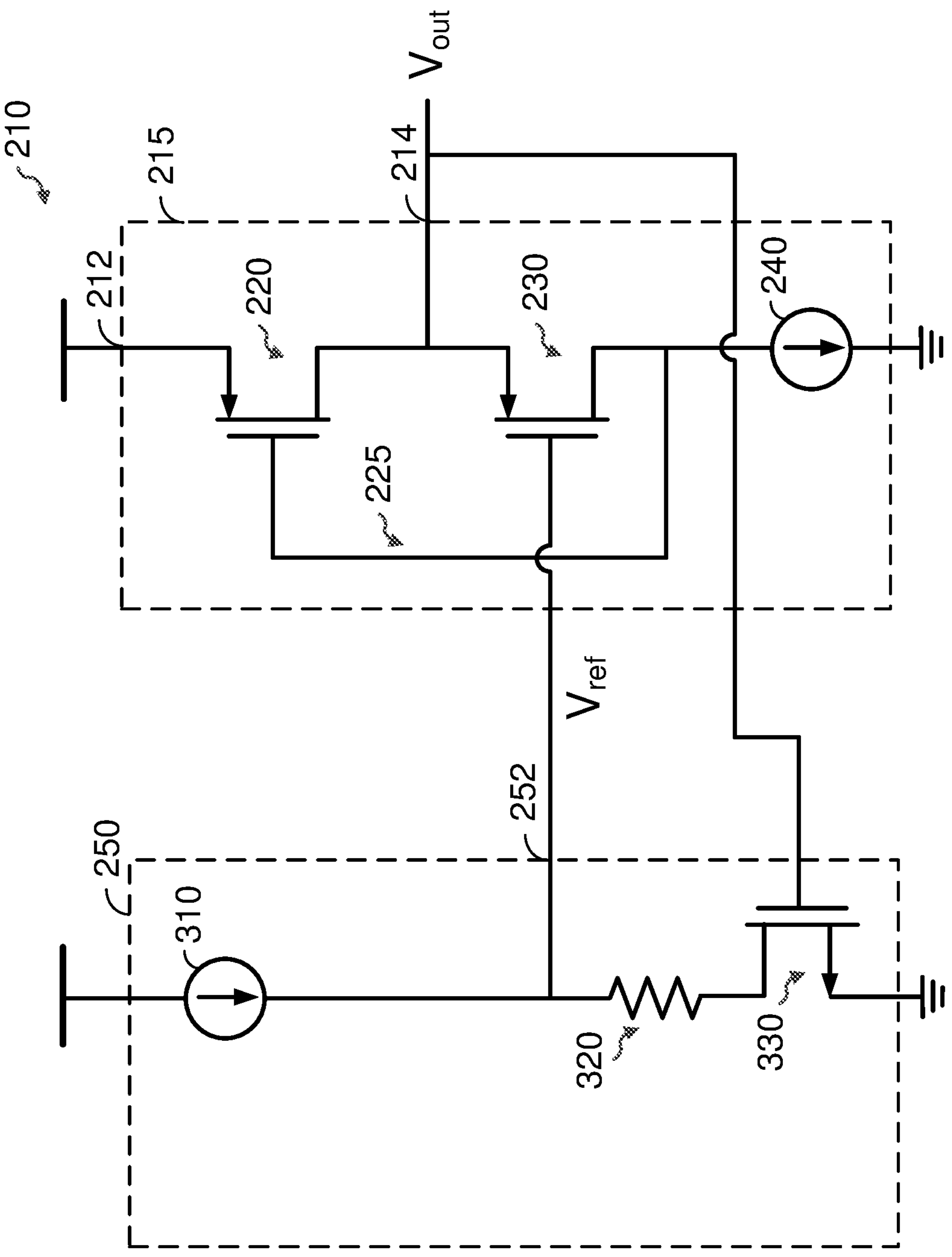
FIG. 3 shows an exemplary implementation of the reference circuit according to certain aspects of the present disclosure.

FIG. 3 shows an exemplary implementation of the reference circuit 250 according to certain aspects. In this example, the reference circuit 250 includes a second current source 310, a resistor 320, and a third transistor 330. In the discussion below, the current source 240 in the FVF circuit 215 is referred to as the first current source.

The resistor 320 and the third transistor 330 are coupled in series between the output 252 of the reference circuit 250 and ground. The second current source 310 is coupled between the supply rail and the resistor 320. The second current source 310 is configured to generate a current that flows through the resistor 320 and the third transistor 330 to generate the reference voltage $V_{ref}$ at the output 252 of the reference circuit 250. In this example, the reference voltage $V_{ref}$ is generated by the current-resistor (IR) voltage drop across the resistor 320 and the third transistor 330, which is proportional to the sum of the resistance of the resistor 320 and the resistance of the third transistor 330 (drain-to-source resistance of the third transistor 330). In this example, the reference voltage $V_{ref}$ may be set to a desired voltage by setting the resistance of the resistor 320 and/or the current of the second current source 310 accordingly.

In the example shown in FIG. 3, the third transistor 330 is implemented with an n-type field effect transistor (NFET). The drain of the third transistor 330 is coupled to the resistor 320, and the source of the third transistor 330 is coupled to ground. The gate of the third transistor 330 is coupled to the output 214 of the voltage regulator 210. Thus, the regulated voltage $V_{out}$ at the output 214 is input to the gate of the third transistor 330.

In this example, the third transistor 330 is operated in the triode region such that the resistance of the third transistor 330 is approximately inversely proportional to the regulated voltage $V_{out}$. Thus, in this example, the third transistor 330 provides a variable resistor with a resistance that is approximately inversely proportional to the regulated voltage $V_{out}$. In this example, the third transistor 330 may be operated in the triode region by choosing a resistance for the resistor 320 and/or a threshold voltage for the third transistor 330 such that the conditions for operation in the triode region are met (e.g., $V_{ds} < V_{gs} - V_t$ where $V_{ds}$ is the drain-to-source voltage of the third transistor 330, Vt is the threshold voltage of the third transistor 330, and $V_{gs}$ is the gate-to-source voltage of the third transistor 330 (which is approximately equal to $V_{out}$ in this example).

In this example, the resistance of the third transistor 330 compensates for variation in the regulated voltage $V_{out}$ due to process-voltage-temperature (PVT) variation to provide a more uniform regulated voltage $V_{out}$ across PVT. For example, when the supply voltage (e.g., supply voltage 125) on the supply rail increases, the increase in the supply voltage may cause an increase in the regulated voltage $V_{out}$. The increase in the regulated voltage $V_{out}$ causes the resistance of the third transistor 330 to decrease since the resistance of the third transistor 330 is approximately inversely proportional to the regulated voltage $V_{out}$. The decrease in the resistance of the third transistor 330 causes the reference voltage $V_{ref}$ to decrease since the reference voltage $V_{ref}$ is proportional to the sum the resistance of the resistor 320 and the resistance of the third transistor 330. The decrease in the reference voltage $V_{ref}$ causes the regulated voltage $V_{out}$ to decrease, which counteracts the increase in the regulated voltage $V_{out}$ due to the increase in the supply voltage.

In this example, the compensation of the regulated voltage $V_{out}$ is performed by the third transistor 330 in the reference circuit 250. This avoids the need of having to modify the FVF circuit 215 to provide the compensation, which may impact the performance of the FVF circuit 215 (e.g., power supply rejection ratio (PSRR), complexity, and speed (i.e., the maximum power noise frequency at which the PSRR is still good)).

Figure 4:
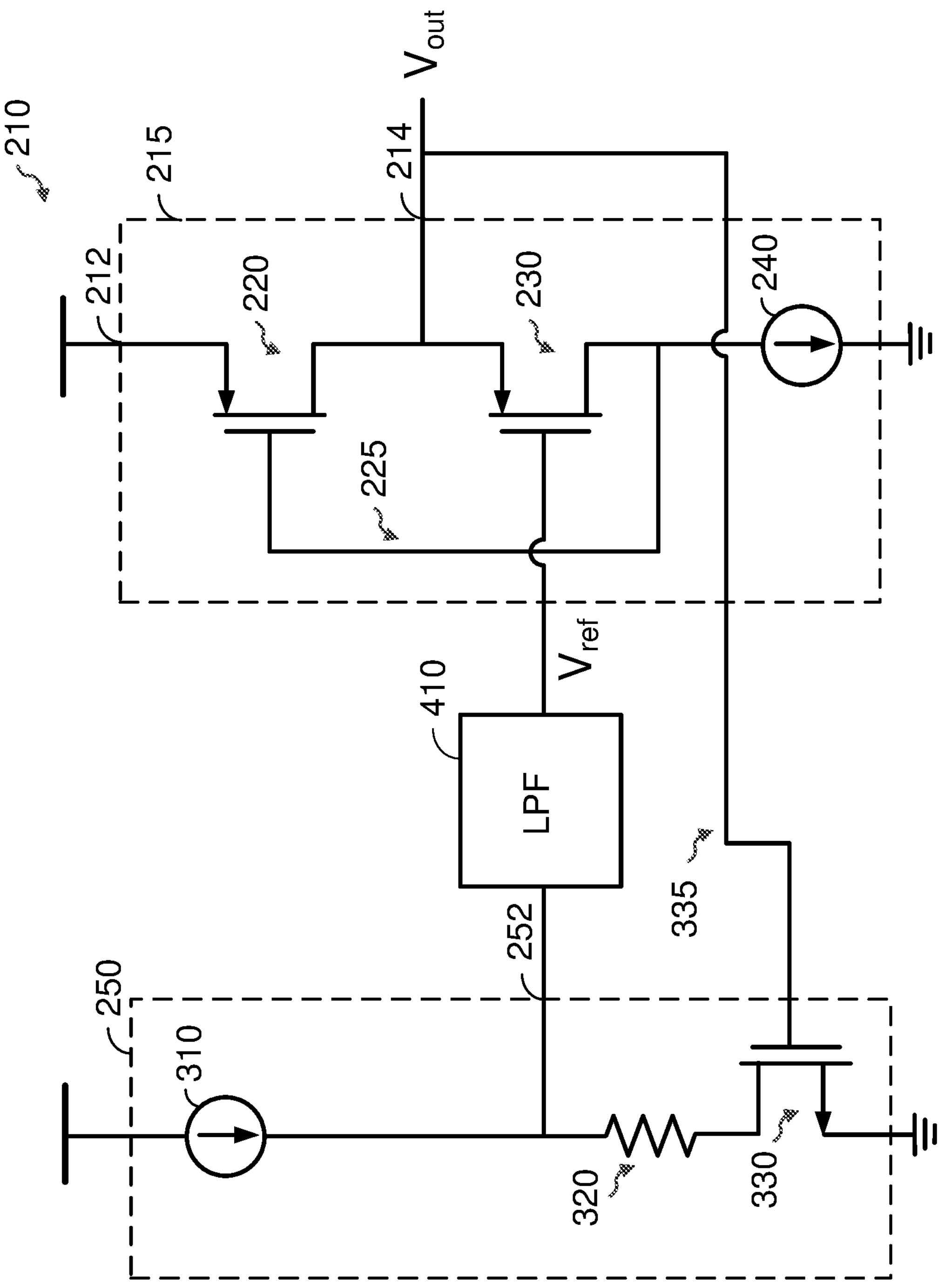
FIG. 4 shows an example of a low pass filter coupled between the reference circuit and the FVF circuit according to certain aspects of the present disclosure.
Figure 5:
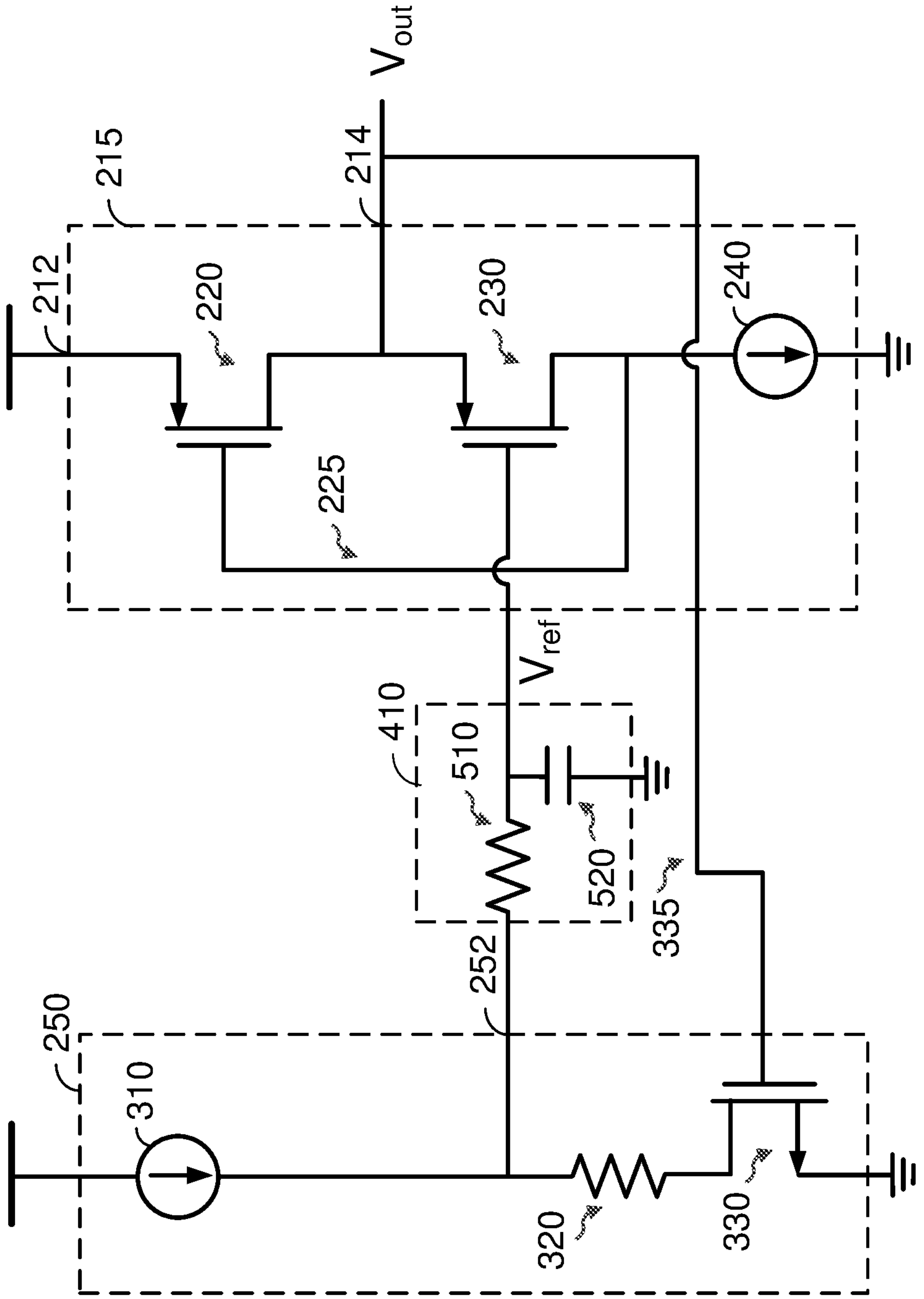
FIG. 5 shows an exemplary implementation of the low pass filter according to certain aspects of the present disclosure.

FIG. 4 shows an example in which a low pass filter 410 is coupled between the output 252 of the reference circuit 250 and the gate of the second transistor 230. The low pass filter 410 is configured to filter out thermal noise and/or power supply noise from the reference voltage $V_{ref}$ to provide a clean reference voltage $V_{ref}$ to the FVF circuit 215. FIG. 5 shows an exemplary implementation of the low pass filter 410 according to certain aspects. In this example, the low pass filter 410 is implemented with a resistor-capacitor (RC) low pass filter including a resistor 510 and a capacitor 520, in which the resistor 510 is coupled between the output 252 of the reference circuit 250 and the gate of the second transistor 230, and the capacitor 520 is coupled between the gate of the second transistor 230 and ground. However, it is to be appreciated that the low pass filter 410 is not limited to the example shown in FIG. 5.

Figure 6:
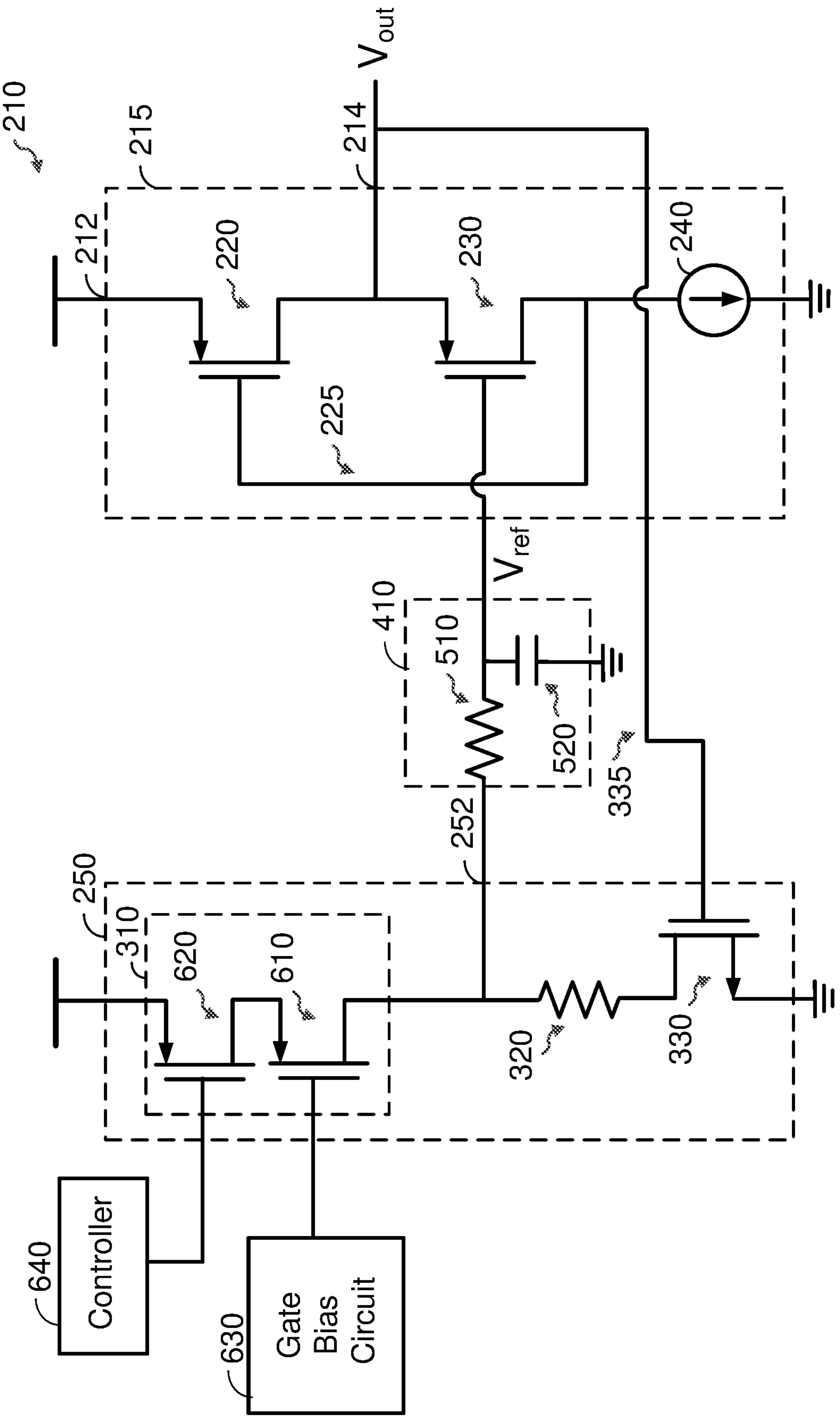
FIG. 6 shows an example of the reference circuit including a source degeneration resistance to compensate for threshold voltage variation according to certain aspects of the present disclosure.

FIG. 6 shows an exemplary implementation of the second current source 310 according to certain aspects. In this example, the second current source 310 includes a fourth transistor 610 and a fifth transistor 620. The drain of the fourth transistor 610 is coupled to the resistor 320 and the gate of the fourth transistor 610 is coupled to a gate bias circuit 630 configured to bias the gate of the fourth transistor 610. As discussed further below, the gate bias circuit 630 may be implemented with a current mirror that biases the gate of the fourth transistor 610 based on a reference current. In this example, each of the fourth transistor 610 and the fifth transistor 620 is implemented with a respective PFET.

In the example in FIG. 6, the drain of the fifth transistor 620 is coupled to the source of the fourth transistor 610 and the source of the fifth transistor 620 is coupled to the supply rail. The on/off state of the fifth transistor 620 is controlled by a controller 640 coupled to the gate of the fifth transistor 620. As discussed further below, the fifth transistor 620 may also be used as a switch for enabling/disabling the reference circuit 250.

During normal operation, the controller 640 turns on the fifth transistor 620 (e.g., by coupling the gate of the fifth transistor 620 to ground potential). When the fifth transistor 620 is turned on, the fifth transistor 620 operates in the triode region in which the resistance of the fifth transistor 620 provides a source degeneration resistance for the fourth transistor 610 that is dependent on the threshold voltage of the fifth transistor 620. In this example, the conditions for operating the fifth transistor 620 in the triode region (e.g., $V_{ds} < V_{gs} - V_t$) can be met since the $V_{ds}$ of the fifth transistor 620 is small compared with the $V_{gs}$ of the fifth transistor 620 (which is approximately equal to the supply voltage assuming the gate of the fifth transistor 620 is coupled to the ground potential).

In this example, the fifth transistor 620 is used to compensate the regulated voltage $V_{out}$ at the output 214 for variation in the threshold voltage of the second transistor 230 due to PVT variation. The fifth transistor 620 is able to compensate for the variation in the threshold voltage of the second transistor 230 because the fifth transistor 620 and the second transistor 230 are integrated on the same chip and are therefore subject to the same or similar PVT. As a result, variation in the threshold voltage of the fifth transistor 620 due to PVT variation tracks variation in the threshold voltage of the second transistor 230 due to PVT.

For example, when the threshold voltage of the second transistor 230 is larger than a nominal threshold voltage due to process variation, the larger threshold voltage causes the regulated voltage $V_{out}$ at the output 214 to be higher than the nominal regulated voltage. In this example, the threshold voltage of the fifth transistor 620 is also larger than the nominal threshold voltage since the threshold voltage of the fifth transistor 620 tracks the threshold voltage of the second transistor 230. The larger threshold voltage of the fifth transistor 620 causes the source degeneration resistance of the fourth transistor 610 to be larger, which reduces the current of the second current source 310. The reduced current reduces the reference voltage $V_{ref}$. The reduced reference voltage $V_{ref}$ reduces the regulated voltage $V_{out}$, which counteracts the larger regulated voltage $V_{out}$ due to the larger threshold voltage.

In this example, the compensation of the regulated voltage $V_{out}$ for threshold voltage variation is performed by the fifth transistor 620 in the reference circuit 250. This avoids the need of having to modify the FVF circuit 215 to provide the compensation, which may impact the performance of the FVF circuit 215.

Figure 7:
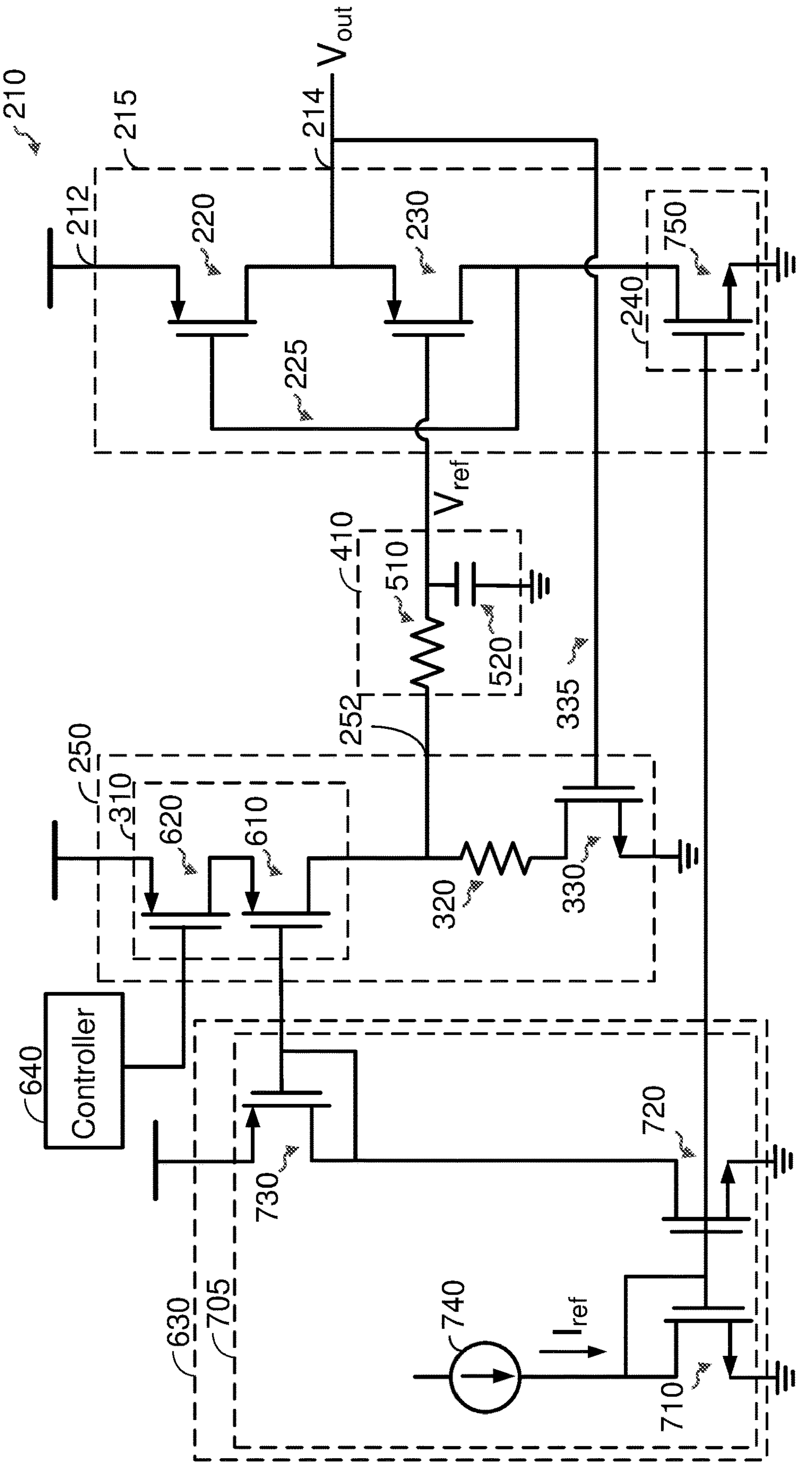
FIG. 7 shows an exemplary implementation of a gate bias circuit including a current mirror according to certain aspects of the present disclosure.

FIG. 7 shows an exemplary implementation of the gate bias circuit 630 according to certain aspects. In this example, the gate bias circuit 630 includes a current mirror 705 configured to bias the gate of the fourth transistor 610 based on a reference current such that the current of the fourth transistor 610 is approximately equal to or approximately proportional to the reference current, as discussed further below.

In the example shown in FIG. 7, the current mirror 705 includes a reference current source 740, a sixth transistor 710, a seventh transistor 720, and an eighth transistor 730. The drain of the sixth transistor 710 is coupled to the reference current source 740, the source of the sixth transistor 710 is coupled to ground, and the gate of the sixth transistor 710 is coupled to the drain of the sixth transistor 710. The gate of the seventh transistor 720 is coupled to the gate of the sixth transistor 710 and the source of the seventh transistor 720 is coupled to ground. The source of the eighth transistor 730 is coupled to the supply rail, the drain of the eighth transistor 730 is coupled to the drain of the seventh transistor 720, and the gate of the eighth transistor 730 is coupled the gate of the fourth transistor 610 and the drain of the eighth transistor 730. In the example shown in FIG. 7, each of the sixth transistor 710 and the seventh transistor 720 is implemented with a respective NFET, and the eighth transistor 730 is implemented with a PFET.

In operation, the reference current source 740 generates a reference current $I_{ref}$ that flows into the drain of the sixth transistor 710. The seventh transistor 720 mirrors the reference current flowing through the sixth transistor 710. The mirrored reference current flows through the eighth transistor 730 since the eighth transistor 730 is coupled to the seventh transistor 720. The mirrored reference current flowing through the eighth transistor 730 causes the eighth transistor 730 to bias the gate of the fourth transistor 610 such that the current of the fourth transistor 610 is approximately equal to the reference current $I_{ref}$ or approximately proportional to the reference current $I_{ref}$ (e.g., depending on the ratio of the channel width of the sixth transistor 710 and the channel width of the seventh transistor 720 and the ratio of the channel width of the eighth transistor 730 and the channel width of the fourth transistor 610). As discussed above, the current flowing through the fourth transistor 610 is also affected by the source degeneration resistance provided by the fifth transistor 620, which compensates for threshold voltage variation.

In the example shown in FIG. 7, the first current source 240 is implemented with a ninth transistor 750 (e.g., NFET). The drain of the ninth transistor 750 is coupled to the drain of the second transistor 230, the source of the ninth transistor 750 is coupled to ground, and the gate of the ninth transistor 750 is coupled to the gate of the sixth transistor 710. In this example, the ninth transistor 750 mirrors the reference current $I_{ref}$ flowing through the sixth transistor 710 to provide the bias current for the FVF circuit 215. The bias current may be approximately equal to the reference current $I_{ref}$ or approximately proportional to the reference current $I_{ref}$ (e.g., depending on the ratio of the channel width of the sixth transistor 710 and the channel width of the ninth transistor 750).

Figure 8:
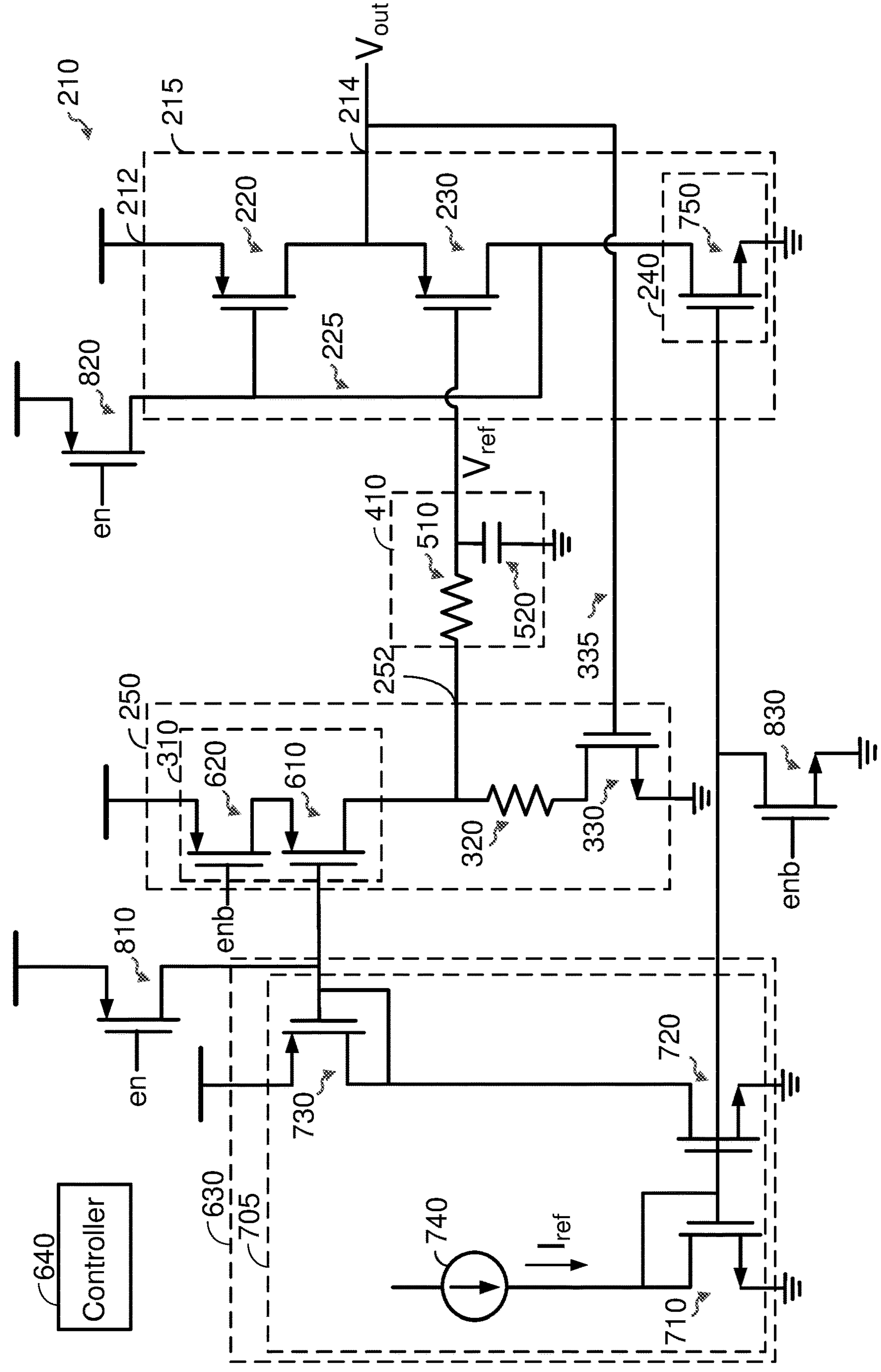
FIG. 8 shows an example of switches for enabling/disabling the reference circuit and the FVF circuit according to certain aspects of the present disclosure.

FIG. 8 shows an example in which the voltage regulator 210 includes transistors for enabling/disabling the voltage regulator 210 including a tenth transistor 810, an eleventh transistor 820, and a twelfth transistor 830. In this example, the fifth transistor 620 is also used for enabling/disabling the voltage regulator 210.

In the example shown in FIG. 8, the source of the tenth transistor 810 is coupled to the supply rail and the drain of the tenth transistor 810 is coupled to the gate of the eighth transistor 730 and the gate of the fourth transistor 610. The source of the eleventh transistor 820 is coupled to the supply rail and the drain of the eleventh transistor 820 is coupled to the gate of the first transistor 220. The drain of the twelfth transistor 830 is coupled to the gates of the sixth transistor 710, the seventh transistor 720, and the ninth transistor 750, and the source of the twelfth transistor 830 is coupled to ground. In this example, each of the tenth transistor 810 and the eleventh transistor 820 is implemented with a respective PFET, and the twelfth transistor 830 is implemented with an NFET.

In this example, the controller 640 outputs an enable signal en to the gate of the tenth transistor 810 and the gate of the eleventh transistor 820, and outputs the complement of the enable signal enb to the gate of the fifth transistor 620 and the gate of the twelfth transistor 830. To enable the voltage regulator 210, the controller 640 sets the enable signal en high (e.g., supply voltage) and sets the complementary enable signal enb low (e.g., ground potential). This turns off the tenth transistor 810, the eleventh transistor 820, and the twelfth transistor 830, and turns on the fifth transistor 620. When the voltage regulator 210 is enabled, the fifth transistor 620 provides source degeneration resistance for the fourth transistor 610, as discussed above.

To disable the voltage regulator 210, the controller 640 sets the enable signal en low (e.g., ground potential) and sets the complementary enable signal enb high (e.g., supply voltage). This turns on the tenth transistor 810, the eleventh transistor 820, and the twelfth transistor 830, and turns off the fifth transistor 620. As a result, the tenth transistor 810 couples the gates of the eighth transistor 730 and the fourth transistor 610 to the supply rail, which turns off the eighth transistor 730 and the fourth transistor 610. The eleventh transistor 820 couples the gate of the first transistor 220 to the supply rail, which turns off the first transistor 220. The twelfth transistor 830 couples the gates of the sixth transistor 710, the seventh transistor 720, and the ninth transistor 750 to ground, which turns off the the sixth transistor 710, the seventh transistor 720, and the ninth transistor 750.

Figure 9:
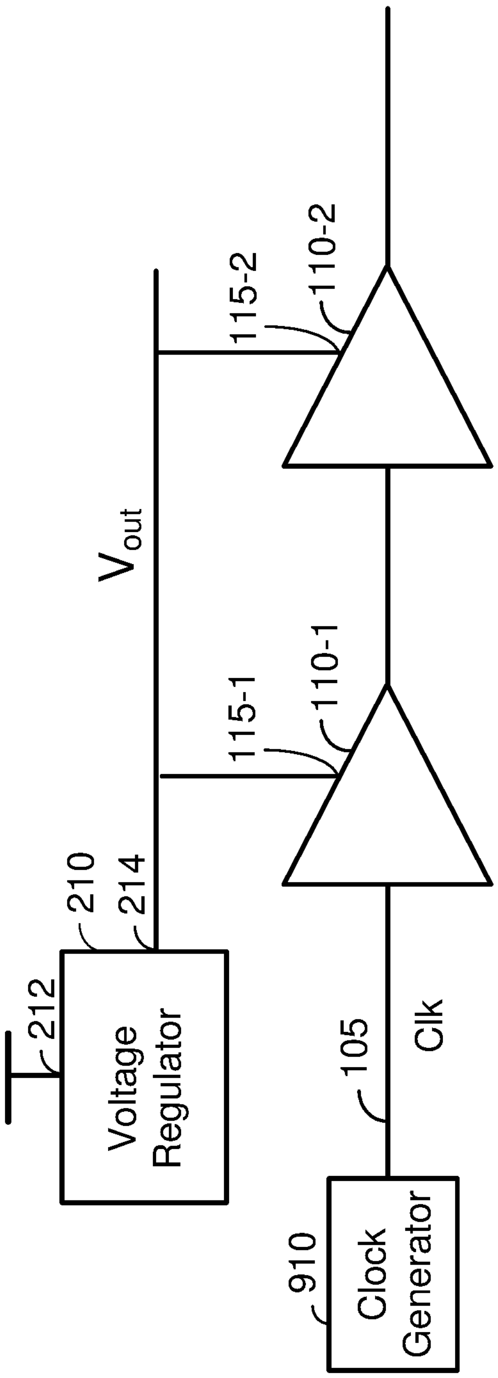
FIG. 9 shows an example of a voltage regulator coupled to clock buffers according to certain aspects of the present disclosure.

FIG. 9 shows an example where the voltage regulator 210 is used to suppress power supply noise for the clock buffers 110-1 and 110-2. However, it is to be appreciated that the voltage regulator 210 is not limited to clock buffers, and may be used to suppress power supply noise for other types of circuits.

In this example, the input 212 of the voltage regulator 210 is coupled to the supply rail, and the output 214 of the voltage regulator 210 is coupled to the power terminals 115-1 and 115-2 of the clock buffers 110-1 and 110-2. The voltage regulator 210 suppress power supply noise on the supply rail to generate the regulated voltage $V_{out}$, which is output to the power terminals 115-1 and 115-2 of the clock buffers 110-1 and 110-2. The power supply noise suppression reduces the introduction of clock jitter in the clock signal Clk as the clock signal Clk propagates through the clock path 105.

In the example shown in FIG. 9, the clock path 105 is coupled to a clock generator 910 configured to generate the clock signal Clk. The clock generator 910 may be implemented with a phase locked loop (PLL) or another type of clock generator.

Figure 10:
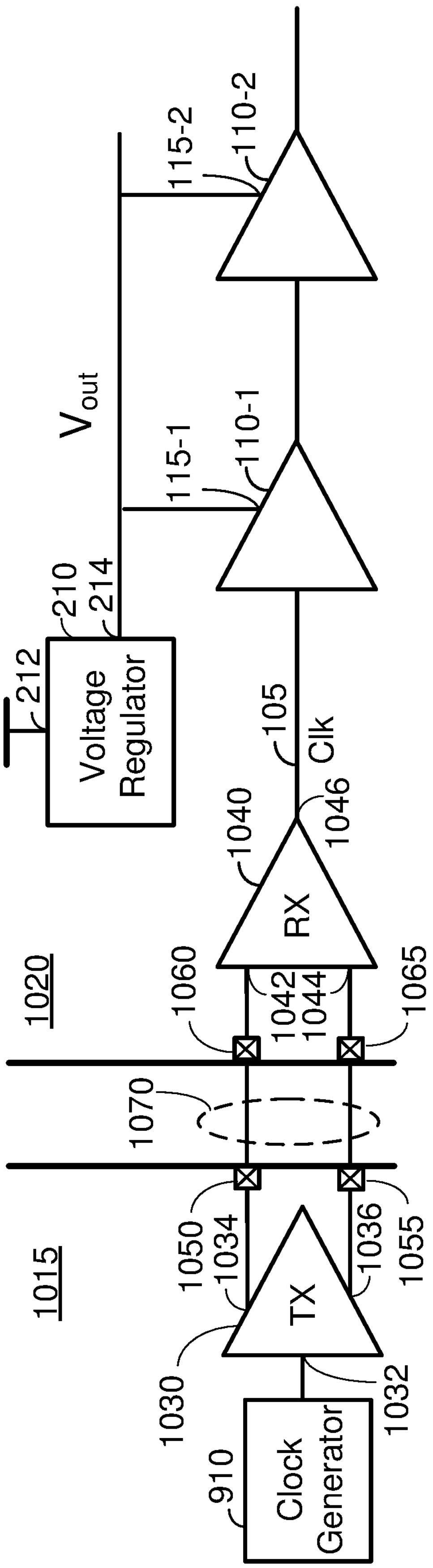
FIG. 10 shows an example of a receiver coupled to the clock buffers for receiving a clock signal via a link according to certain aspects of the present disclosure.

In one example, the clock generator 910 and the clock buffers 110-1 and 110-2 may be integrated on separate chips. In this regard, FIG. 10 shows an example where the clock generator 910 (e.g., PLL) is integrated on a first chip 1015 and the clock buffers 110-1 and 110-2 and the voltage regulator 210 are integrated on a second chip 1020.

In this example, the first chip 1015 includes a transmitter 1030 (also referred to as a driver) having an input 1032, a first output 1034, and a second output 1036. The input 1032 is coupled to the clock generator 910, the first output 1034 is coupled to a first pad 1050 on the first chip 1015, and the second output 1036 is coupled to a second pad 1055 on the first chip 1015.

The second chip 1020 includes a receiver 1040 having a first input 1042, a second input 1044, and an output 1046. The first input 1042 is coupled to a first pad 1060 of the second chip 1020, the second input 1044 is coupled to a second pad 1065 of the second chip, and the output 1046 is coupled to the clock path 105.

The transmitter 1030 on the first chip 1015 and the receiver 1040 on the second chip 1020 are coupled via a differential link 1070 between the first chip 1015 and the second chip 1020. The differential link 1070 includes a first transmission line coupled between the first pad 1050 of the first chip 1015 and the first pad 1060 of the second chip 1020, and a second transmission line coupled between the second pad 1055 of the first chip 1015 and the second pad 1065 of the second chip 1020.

In operation, the transmitter 1030 is configured to receive a clock signal at the input 1032 from the clock generator 910, generate a differential clock signal based on the clock signal, and drive the differential link 1070 with the differential clock signal via the first and second outputs 1034 and 1036. The receiver 1040 is configured to receive the differential clock signal at the first and second input 1042 and 1044, and output the clock signal Clk to the clock path 105 based on the differential clock signal.

The clock buffers 110-1 and 110-2 propagate the clock signal Clk from the receiver 1040 through the clock path 105. For example, the clock path 105 may distribute the clock signal Clk to a clock data recovery (CDR) circuit, a parallel-to-serial converter, and/or another type of circuit. It is to be appreciated that the clock path 105 may include additional circuits not shown in FIG. 10 including, for example, a duty cycle corrector (DCC). It is also to be appreciated that the first chip 1015 may include one or more additional circuits in the clock path between the clock generator 910 and the input 1032 of the transmitter 1030 including, for example, one or more clock buffers, a DCC, or any combination thereof.

Figure 11:
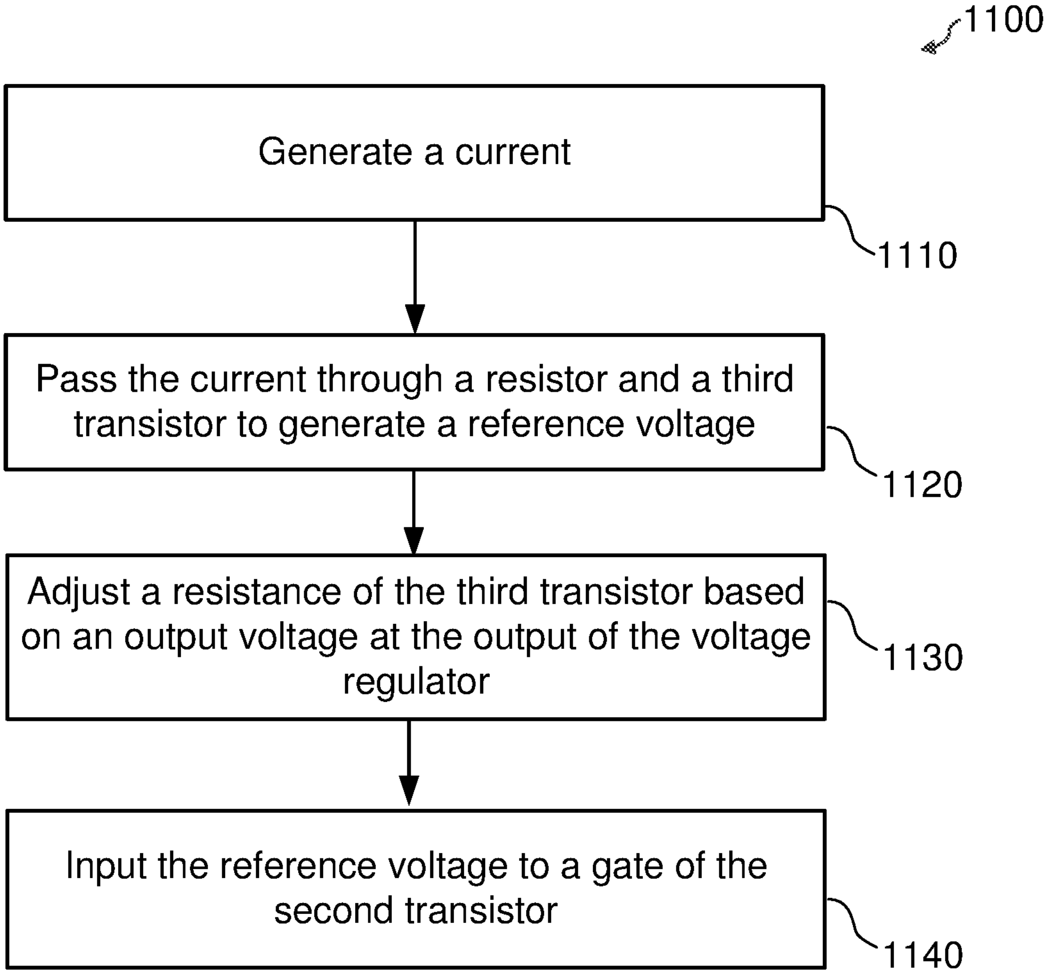
FIG. 11 is a flowchart illustrating a method of operating a voltage regulator according to certain aspects of the present disclosure.

FIG. 11 illustrates a method 1100 for operating voltage regulator according to certain aspects. The voltage regulator (e.g., voltage regulator 210) includes a first transistor (e.g., first transistor 220) and a second transistor (e.g., second transistor 230), wherein a source of the first transistor is coupled to a supply rail, a drain of the first transistor is coupled to an output of the voltage regulator, a source of the second transistor is coupled to the output of the voltage regulator, and a drain of the second transistor is coupled to a gate of the first transistor via a feedback path (e.g., feedback path 225).

At block 1110, a current is generated. For example, the current may be generated by the second current source 310.

At block 1120, the current passes through a resistor and a third transistor to generate a reference voltage. The resistor may correspond to the resistor 320 and the third transistor my correspond to the third transistor 330. The reference voltage may correspond to the reference voltage $V_{ref}$.

At block 1130, a resistance of the third transistor is adjusted based on an output voltage at the output of the voltage regulator. The output voltage may correspond to the regulated voltage $V_{out}$ and the resistance of the third transistor may correspond to the drain-to-source resistance of the third transistor 330.

At block 1140, the reference voltage is input to a gate of the second transistor. In certain aspects, the reference voltage may be filtered (e.g., using the low pass filter 410).

In certain aspects, adjusting the resistance of the third transistor based on the output voltage includes operating the third transistor in a triode region, and coupling the output of the voltage regulator to a gate of the third transistor.

In certain aspects, generating the current includes generating the current using a fourth transistor, and the method 1100 further includes providing a source degeneration resistance at a source of the fourth transistor. For example, the source degeneration resistance may be provided by the drain-to-source resistance of the fifth transistor 620.

In certain aspects, providing the source degeneration resistance includes providing the source degeneration resistance using a fifth transistor, wherein a threshold voltage of the fifth transistor tracks a threshold voltage of the second transistor. The fifth transistor may correspond to the fifth transistor 620. In certain aspects, the method 1100 may further include operating the fifth transistor in a triode region.

In certain aspects, generating the current further includes biasing a gate of the fourth transistor based on a reference current using a current mirror. The current mirror may correspond to the current mirror 705 and the reference current may correspond to the reference current $I_{ref}$.

Implementation examples are described in the following numbered clauses:

1. A voltage regulator, comprising:
   - a first transistor, wherein a source of the first transistor is coupled to a supply rail, and a drain of the first transistor is coupled to an output of the voltage regulator;
   - a second transistor, wherein a source of the second transistor is coupled to the output of the voltage regulator, and a drain of the second transistor is coupled to a gate of the first transistor via a feedback path;
   - a first current source coupled to the drain of the second transistor;
   - a second current source;
   - a third transistor, wherein a gate of the third transistor is coupled to the output of the voltage regulator, and a source of the third transistor is coupled to a ground; and
   - a resistor coupled between a drain of the third transistor and the second current source, wherein the gate of the second transistor is coupled between the resistor and the second current source.
2. The voltage regulator of clause 1, further comprising a low pass filter coupled between resistor and the gate of the second transistor.
3. The voltage regulator of clause 2, wherein the low pass filter comprises a resistor-capacitor (RC) low pass filter.
4. The voltage regulator of any one of clauses 1 to 3, wherein the second current source comprises:
   - a fourth transistor, wherein a drain of the fourth transistor is coupled to the resistor;
   - a fifth transistor, wherein a drain of the fifth transistor is coupled to a source of the fourth transistor, and a source of the fifth transistor is coupled to the supply rail;
   - a gate bias circuit configured to bias a gate of the fourth transistor; and
   - a controller coupled to a gate of the fourth transistor, wherein the controller is configured to turn on the fourth transistor when the second current source is enabled.
5. The voltage regulator of clause 4, wherein the second transistor comprises a first p-type field effect transistor, and the fifth transistor comprises a second p-type field effect transistor.
6. The voltage regulator of clause 4 or 5, wherein controller is configured to turn off the fourth transistor when the second current source is disabled.
7. The voltage regulator of any one of clauses 4 to 6, wherein the controller is configured to couple the gate of the fourth transistor to the ground to turn on the fourth transistor.

8. The voltage regulator of any one of clauses 4 to 7, wherein the gate bias circuit comprises a current mirror configured to bias the gate of the fourth transistor based on a reference current.
9. The voltage regulator of any one of clauses 1 to 8, wherein the first transistor comprises a first p-type field effect transistor, the second transistor comprises a second p-type field effect transistor, and the third transistor comprises an n-type field effect transistor.
10. The voltage regulator of any one of clauses 1 to 9, wherein the output of the voltage regulator is coupled to one or more clock buffers.
11. A method for operating a voltage regulator including a first transistor and a second transistor, wherein a source of the first transistor is coupled to a supply rail, a drain of the first transistor is coupled to an output of the voltage regulator, a source of the second transistor is coupled to the output of the voltage regulator, and a drain of the second transistor is coupled to a gate of the first transistor via a feedback path, the method comprising:
   generating a current;
   passing the current through a resistor and a third transistor to generate a reference voltage;
   adjusting a resistance of the third transistor based on an output voltage at the output of the voltage regulator; and
   inputting the reference voltage to a gate of the second transistor.
12. The method of clause 11, wherein adjusting the resistance of the third transistor based on the output voltage comprises:
   operating the third transistor in a triode region; and
   coupling the output of the voltage regulator to a gate of the third transistor.
13. The method of clause 11 or 12, wherein generating the current comprises generating the current using a fourth transistor, and the method further comprises providing a source degeneration resistance at a source of the fourth transistor.
14. The method of clause 13, wherein providing the source degeneration resistance comprising providing the source degeneration resistance using a fifth transistor, wherein a threshold voltage of the fifth transistor tracks a threshold voltage of the second transistor.
15. The method of clause 14, further comprising operating the fifth transistor in a triode region.
16. The method of any one of clauses 13 to 15, wherein generating the current further comprises biasing a gate of the fourth transistor based on a reference current using a current mirror.
17. The method of any one of clauses 1 to 16, further comprising filtering the reference voltage using a low pass filter.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “approximately”, as used herein with respect to a stated value or a property, is intended to indicate being within 10% of the stated value or property (i.e., between 90% to 110% of the stated value or property).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A voltage regulator, comprising:
- a first transistor, wherein a source of the first transistor is coupled to a supply rail, and a drain of the first transistor is coupled to an output of the voltage regulator;
- a second transistor, wherein a source of the second transistor is coupled to the output of the voltage regulator, and a drain of the second transistor is coupled to a gate of the first transistor via a feedback path;
- a first current source coupled to the drain of the second transistor;
- a second current source;
- a third transistor, wherein a gate of the third transistor is coupled to the output of the voltage regulator, and a source of the third transistor is coupled to a ground; and
- a resistor coupled between a drain of the third transistor and the second current source, wherein a gate of the second transistor is coupled between the resistor and the second current source.

2. The voltage regulator of claim 1, further comprising a low pass filter coupled between the resistor and the gate of the second transistor.

3. The voltage regulator of claim 2, wherein the low pass filter comprises a resistor-capacitor (RC) low pass filter.

4. The voltage regulator of claim 1, wherein the second current source comprises:
- a fourth transistor, wherein a drain of the fourth transistor is coupled to the resistor;
- a fifth transistor, wherein a drain of the fifth transistor is coupled to a source of the fourth transistor, and a source of the fifth transistor is coupled to the supply rail;
- a gate bias circuit configured to bias a gate of the fourth transistor; and
- a controller coupled to the gate of the fourth transistor, wherein the controller is configured to turn on the fourth transistor when the second current source is enabled.

5. The voltage regulator of claim 4, wherein the second transistor comprises a first p-type field effect transistor, and the fifth transistor comprises a second p-type field effect transistor.

6. The voltage regulator of claim 4, wherein the controller is configured to turn off the fourth transistor when the second current source is disabled.

7. The voltage regulator of claim 4, wherein the controller is configured to couple the gate of the fourth transistor to the ground to turn on the fourth transistor.

8. The voltage regulator of claim 4, wherein the gate bias circuit comprises a current mirror configured to bias the gate of the fourth transistor based on a reference current.

9. The voltage regulator of claim 1, wherein the first transistor comprises a first p-type field effect transistor, the second transistor comprises a second p-type field effect transistor, and the third transistor comprises an n-type field effect transistor.

10. The voltage regulator of claim 1, wherein the output of the voltage regulator is coupled to one or more clock buffers.

11. A method for operating a voltage regulator including a first transistor and a second transistor, wherein a source of the first transistor is coupled to a supply rail, a drain of the first transistor is coupled to an output of the voltage regulator, a source of the second transistor is coupled to the output of the voltage regulator, and a drain of the second transistor is coupled to a gate of the first transistor via a feedback path, the method comprising:

generating a current;

passing the current through a resistor and a third transistor to generate a reference voltage;

adjusting a resistance of the third transistor based on an output voltage at the output of the voltage regulator; and inputting the reference voltage to a gate of the second transistor.

12. The method of claim 11, wherein adjusting the resistance of the third transistor based on the output voltage comprises:

operating the third transistor in a triode region; and coupling the output of the voltage regulator to a gate of the third transistor.

13. The method of claim 11, wherein generating the current comprises generating the current using a fourth transistor, and the method further comprises providing a source degeneration resistance at a source of the fourth transistor.

14. The method of claim 13, wherein providing the source degeneration resistance comprises providing the source degeneration resistance using a fifth transistor, wherein a threshold voltage of the fifth transistor tracks a threshold voltage of the second transistor.

15. The method of claim 14, further comprising operating the fifth transistor in a triode region.

16. The method of claim 13, wherein generating the current further comprises biasing a gate of the fourth transistor based on a reference current using a current mirror.

17. The method of claim 11, further comprising filtering the reference voltage using a low pass filter.

* * * * *